United States Patent [19]
Iwata

[11] Patent Number: 5,975,032
[45] Date of Patent: Nov. 2, 1999

[54] ENGINE COOLING SYSTEM

[75] Inventor: Yoshibumi Iwata, Hamamatsu, Japan

[73] Assignee: Sanshin Kogyo Kabushiki Kaisha, Hamamatsu, Japan

[21] Appl. No.: 08/871,752

[22] Filed: Jun. 9, 1997

[30]     Foreign Application Priority Data

Jun. 7, 1996   [JP]   Japan ................................ 8-145645

[51] Int. Cl.⁶ ...................................................... F01P 3/00
[52] U.S. Cl. .................................. 123/41.31; 123/41.09; 123/541; 440/88
[58] Field of Search ............................. 123/41.31, 41.09, 123/445, 446, 472, 541, 195 P, 196 W; 440/88, 900

[56]                References Cited

U.S. PATENT DOCUMENTS

| | | | |
|---|---|---|---|
| 4,491,117 | 1/1985 | Koide | 123/541 |
| 4,493,294 | 1/1985 | Umemura | 123/41.33 |
| 5,156,134 | 10/1992 | Tochizawa | 123/541 |
| 5,216,996 | 6/1993 | Kato | 123/516 |
| 5,309,885 | 5/1994 | Rawlings et al. | 123/41.31 |
| 5,438,962 | 8/1995 | Iwata et al. | 123/41.31 |
| 5,505,166 | 4/1996 | Katoh | 123/509 |
| 5,797,378 | 8/1998 | Kato | 123/533 |

*Primary Examiner*—Henry C. Yuen
*Assistant Examiner*—Hai Huynh
*Attorney, Agent, or Firm*—Knobbe, Martens, Olson & Bear LLP

[57]              ABSTRACT

An internal combustion engine having a cooling system which cools a portion of a fuel delivery system is disclosed. The engine has at least one combustion chamber and an intake system for supplying air to the combustion chamber. The fuel delivery system includes a fuel supply mechanism for supplying fuel under pressure to a fuel injector through a fuel rail, the fuel injector supplying fuel to the combustion chamber. The cooling system includes a coolant supply mechanism for supplying coolant to a cooling jacket about at least a portion of the fuel rail for cooling fuel passing through the fuel rail.

9 Claims, 5 Drawing Sheets

ENGINE COOLING SYSTEM

FIELD OF THE INVENTION

The present invention relates to a cooling system for an engine. More particularly, the present invention is a cooling system which cools a portion of a fuel supply system of an engine.

BACKGROUND OF THE INVENTION

Internal combustion engines frequently employ fuel delivery systems in which fuel is delivered to the engine with at least one fuel injector. This fuel system generally includes a fuel source and a high pressure pump which delivers fuel to each injector through a supply line. Where the engine has multiple fuel injectors, each fuel injector is often coupled to a fuel rail, the injectors spaced along the length of the rail. The high pressure pump delivers fuel under pressure to the rail, and thus the injectors.

Each injector includes a nozzle through which fuel passes into an air stream (such as in an intake pipe or passage) or directly into a combustion chamber of the engine. The injector may be solenoid operated, such that upon activation, fuel under pressure in the rail passes into the injector and out its nozzle. When not activated, fuel is prevented from passing through the injector. In this manner, the flow of fuel to the engine is controlled.

Fuel which is delivered to the fuel rail but not supplied to the engine by the injector(s) is preferably routed back to the fuel supply for re-delivery. This fuel should be returned to the fuel supply without lowering the high pressure of the fuel within the fuel rail, this high pressure being necessary for proper atomization of the fuel delivered by each injector. Thus, a pressure regulator is positioned at the end of the fuel rail between the injectors and a return line.

FIG. 1 illustrates such a prior art fuel return arrangement. As illustrated, a pressure regulator 200 is positioned at the end of a fuel rail 202. The regulator 200 has a body or housing 204 which is separated into a top chamber 206 and a bottom chamber 208 by a diaphragm 210 connected to a valve disc 212. A spring 214 presses the disc 212 downwardly over the opening of a fuel return line 214. A reference line 218 in communication with the top chamber 206 extends from the regulator 200 to a portion of the air intake system of the engine.

In operation, as the pressure within the fuel rail 202 increases, it eventually overcomes the pressure of the air within the top chamber 206 and that force applied by the spring 214, and moves the diaphragm 210 upwardly. As this occurs, the disc 212 moves off of the opening of the return line 216, and fuel flows back to the fuel supply.

As can be appreciated, when the engine is operating at high speeds, the pressure regulator works efficiently. When the engine speed is high, a high pressure within the top chamber 206 combines with the force supplied by the spring 214. Thus, before the return line 216 is opened, a very high pressure in the fuel rail 202 must be achieved. In this manner, the pressure within the fuel rail 202 remains high. The high pressure fuel within the rail 202 which is delivered through the injectors is well atomized as it passes through the nozzle thereof.

At low engine speeds or loads, however, the air pressure within the top chamber is low, and the fuel pressure in the fuel rail may be relatively low and still raise the disc 212, permitting fuel return. Thus, the fuel pressure in the rail remains low, and the fuel is not well atomized. In addition, the engine operating temperature is low. Some of the fuel delivered into the combustion chamber hits the cylinder walls, cylinder head or other engine components and is vaporized. On the other hand, because the engine temperature is low, other of the fuel (which is not well atomized because the fuel pressure is low) is not vaporized. The result is unstable or incomplete combustion because of the large differences in the air/fuel mixture throughout the combustion chamber, lending to engine inefficiency and low power.

It is desired to provide a fuel supply system which includes a fuel return, but which also provides fuel to the engine in a manner which promotes stable combustion across the entire operating range of the engine.

SUMMARY OF THE INVENTION

In accordance with the present invention, there is provided a cooling system for an engine, the cooling system including a cooling path for cooling a portion of a fuel delivery system of an internal combustion engine.

The engine preferably defines at least one combustion chamber and has an intake system for providing air to the combustion chamber. The fuel delivering system includes a fuel supply mechanism for supplying fuel under pressure to a fuel injector through a fuel conduit. The fuel injector is arranged to inject fuel into the combustion chamber.

The cooling system includes a cooling jacket surrounding at least a portion of the fuel conduit for cooling the fuel passing therethrough.

In the preferred embodiment, the fuel conduit comprises a fuel rail supplying fuel to one or more fuel injectors spaced therealong, and the cooling jacket comprises a cooling jacket surrounding the fuel rail.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In general, the present invention is a cooling system for an internal combustion engine of the type which may be used to power an outboard motor. The cooling system in accordance with the present invention is adapted to cool a portion of the fuel system which supplies fuel to the engine for combustion.

Figure 1:
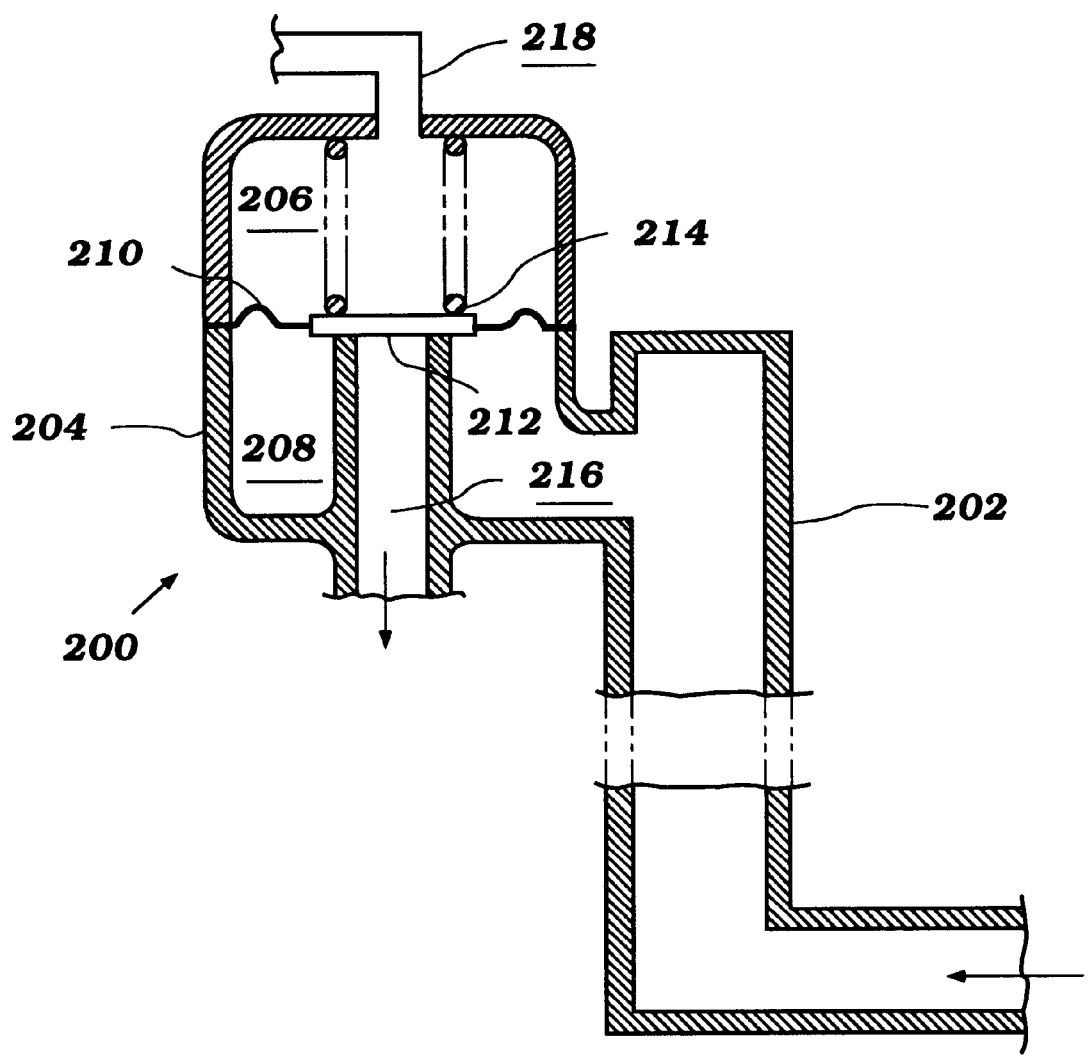
FIG. 1 is a schematic illustrating a fuel pressure regulator in accordance with the prior art.
Figure 2:
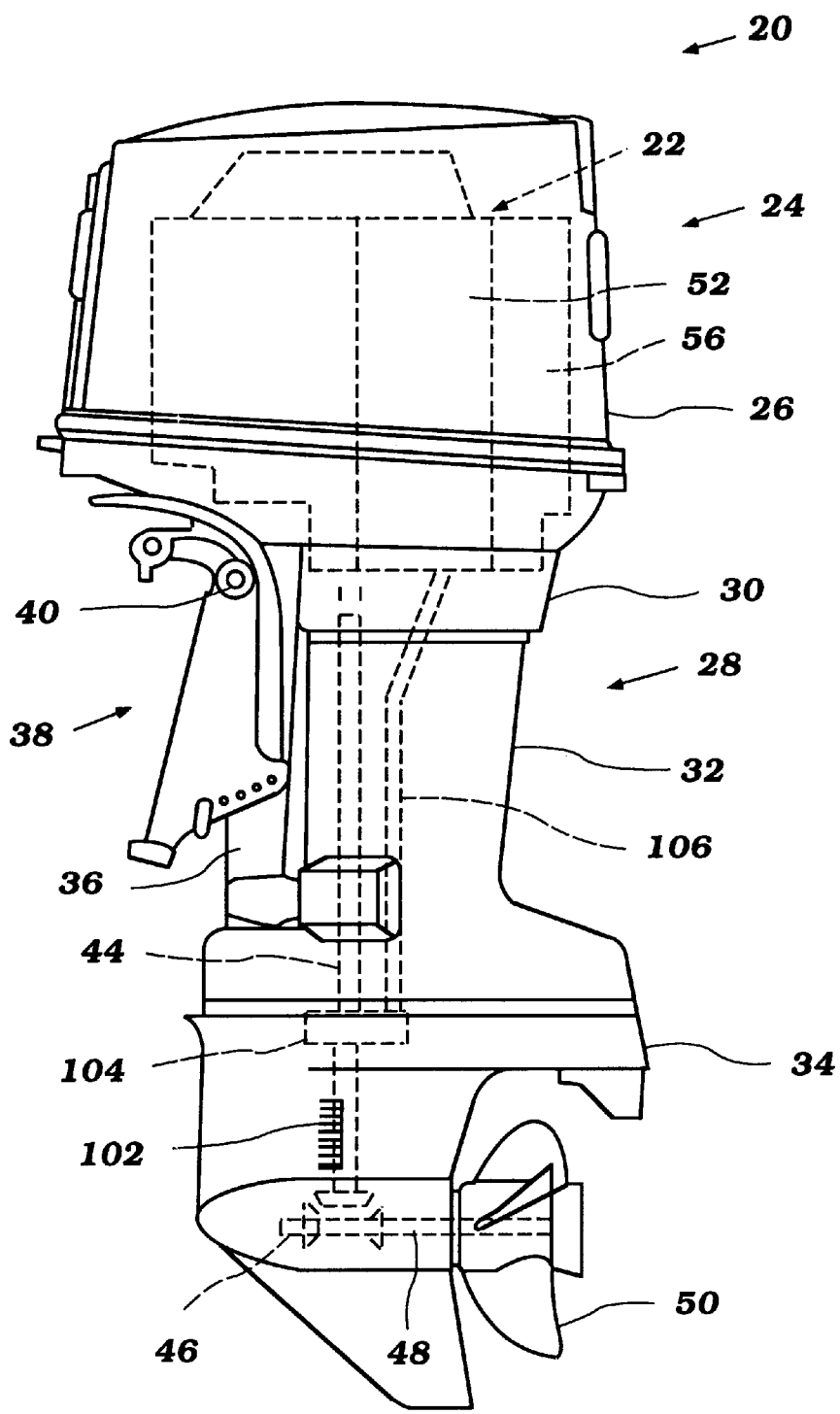
FIG. 2 is a side view of an outboard motor powered by an engine, illustrated in phantom, and having the cooling system of the present invention.

The present invention will now be described in detail with reference to FIGS. 2–7. As illustrated in FIG. 2, the engine cooling system of the present invention is particularly useful with an engine 22 powering an outboard motor 20. While the cooling system may be utilized with engines adapted for other applications, the cooling system is particularly useful with engines utilized to power outboard motors.

The outboard motor 20 has comprises a powerhead 24 defined by a cowling 26, and a lower unit 28 depending below the powerhead 24. The powerhead 24 and lower unit 28 are coupled at an exhaust guide 30. The lower unit 28 comprises a drive shaft housing portion 32 and a lower portion 34.

Preferably, the motor 20 is adapted for secure mounting to a watercraft (not shown), and yet is moveable with respect to the watercraft to which it is attached. In particular, the motor 20 includes a generally vertically extending steering shaft (not shown) rotatably positioned within a steering bracket 36. This mounting permits side-to-side movement of the motor 20 about the vertical axis along which the steering shaft extends, whereby the motor 20 is used to steer the watercraft to which it is attached.

In addition, a clamping bracket 38 is movably connected to the steering bracket 36 about a generally horizontally extending pin 40. This mounting permits the motor 20 to be raised and lowered or "trimmed" about the axis along which the pin extends.

The engine 22 is positioned within the cowling 26 and is oriented such that a crankshaft 42 (see FIG. 3) thereof is generally vertically extending. The crankshaft 42 is arranged in driving relation with a drive shaft 44. The drive shaft 44 extends through the drive shaft housing 32 to a transmission 46 positioned within the lower portion 34 of the lower unit 28.

An output shaft 48 extends from the transmission 46 to a water propulsion device of the motor 20. In the embodiment illustrated, the water propulsion device is a propeller 50 having a hub thereof connected to the end of the output shaft 48.

Figure 3:
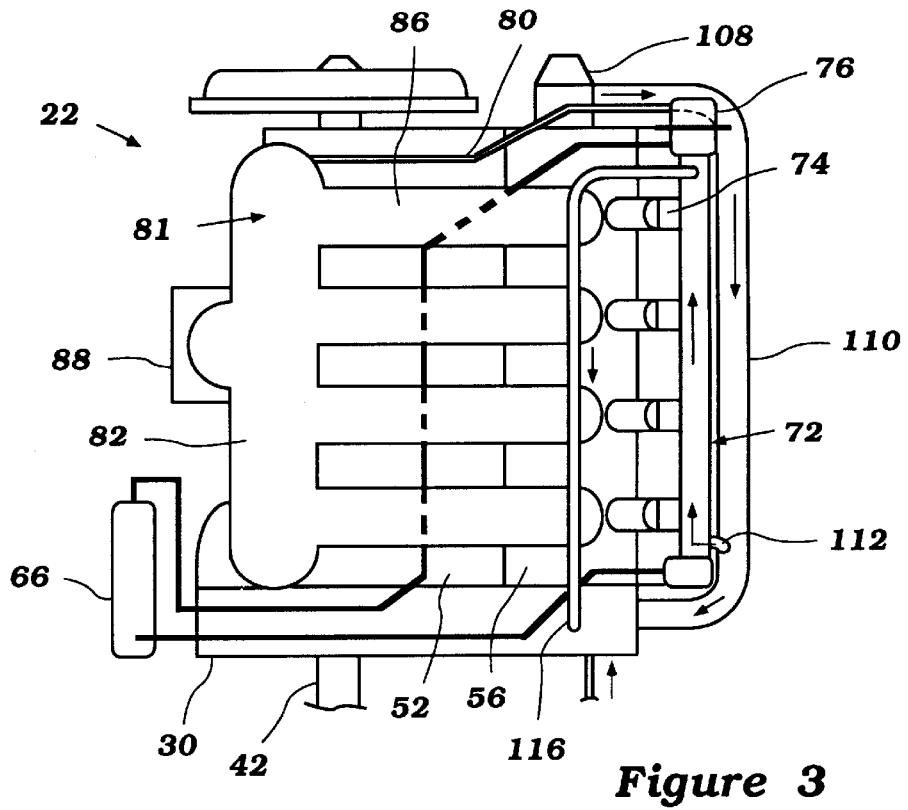
FIG. 3 is a side view of the engine powering the motor illustrated in FIG. 2.
Figure 6:
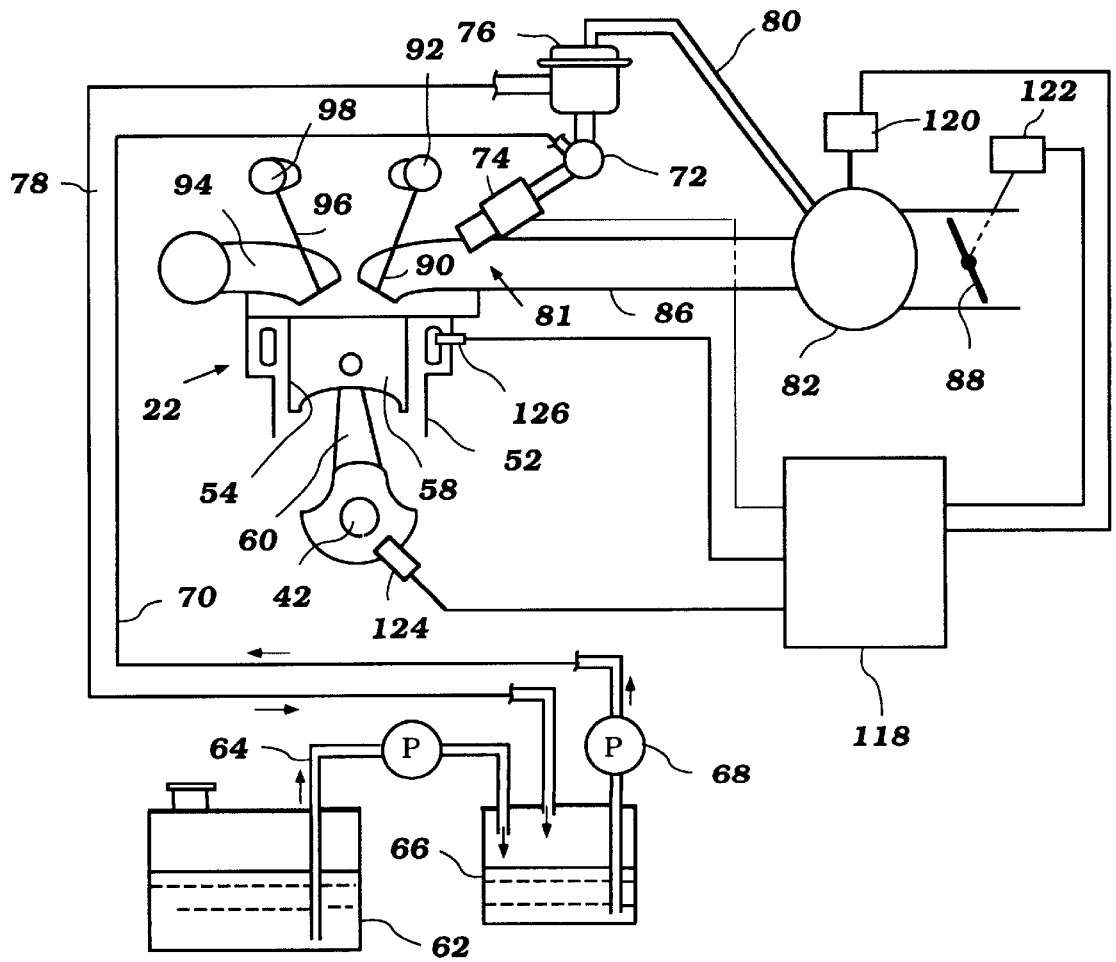
FIG. 6 is a schematic illustrating a fuel supply system for the engine illustrated in FIGS. 3 and 4.

The engine 22 is illustrated in more detail in FIGS. 2, 3 and 6. The engine 22 illustrated is of the in-line, four cylinder variety, operating on a four-cycle principal. It should be understood, however, that the engine 22 may be configured in other arrangements, such as "V" or opposed. In addition, the engine 22 may operate in accordance with other principles such as the Wankel principle.

The engine 22 illustrated has a cylinder body or block 52 defining four cylinders 54. A cylinder head 56 is connected to the cylinder block 52 over an open end of each cylinder 54. The cylinder head 56 preferably has a recessed area therein corresponding to each cylinder, cooperating with the cylinder and a piston 58 to form a combustion chamber.

Each piston 58 is mounted for reciprocation in its respective cylinder 54. Each piston 58 is connected to the crankshaft 42 by a connecting rod 60. The crankshaft 42 rotates within a crankcase defined by the cylinder block 52, and as described above, drives the drive shaft 44.

A fuel delivery system is provided for supplying fuel to each cylinder 54 for combustion. Preferably, the delivery system includes a mechanism for delivering fuel from a fuel supply through a conduit to one or more fuel injectors.

As illustrated in FIG. 6, the delivery system includes a fuel tank 62 or other reservoir from which fuel may be drawn. The fuel tank 62 may be located in the watercraft to which the motor 20 is connected. A fuel supply line 64 extends from the fuel tank 62 to a vapor separator 66. A low pressure fuel pump 68 is preferably positioned along the supply line 64 for pumping fuel from the tank 62 and delivering it to the vapor separator 66. This pump 68 may be a diaphragm type pump or another suitable pump.

A high pressure pump 68 draws fuel from the vapor separator 66 and delivers it through a high pressure fuel line 70 to a fuel rail 72. The pump 68 is preferably electrically operated, and may be positioned within the vapor separator 66 itself.

The fuel rail 72 comprises a conduit or pipe 73 extending generally vertically along the engine 22 from the bottom end of the engine 22 to the top end of the engine. In the arrangement illustrated, the fuel line 70 is connected to the fuel rail 72 at the bottom end of the engine 22, whereby fuel is delivered upwardly through the rail 72 towards the top end of the engine 22.

A fuel injector 74 is provided corresponding to each cylinder 54. Fuel is delivered to each fuel injector 74 from the fuel rail 72 through a connector.

A pressure regulator 76 is preferably positioned at the end of the fuel rail 72 opposite where fuel is delivered thereto by the high pressure fuel line 70. Thus, in the present arrangement where the fuel is supplied at the bottom end of the rail 72, the regulator 76 is positioned at the top end of the rail 72 near the top end of the engine 22.

The regulator 76 has a return line 78 extending back to the vapor separator 66. The regulator 76 is adapted to maintain the fuel pressure within the rail at a high pressure, and yet return that fuel which is not delivered by the fuel injectors 74 back to the vapor separator 66.

In addition, a line 80 extends from the pressure regulator 76 to a surge tank 82 of an air intake system of the engine 22, described in more detail below. This line 80 provides an air pressure reference to the pressure regulator 76 for the engine's speed or load for operation, as described in more detail in conjunction with the prior art described above.

Figure 5:
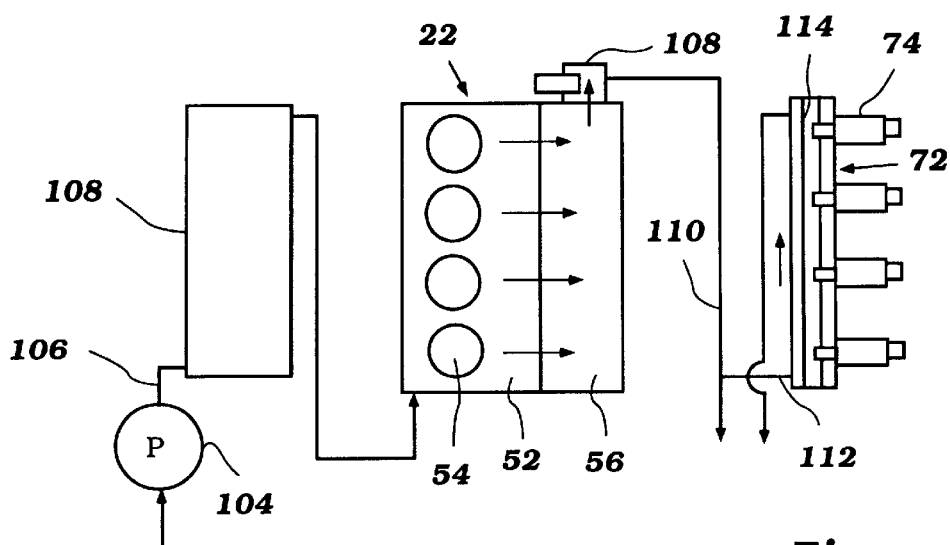
FIG. 5 is a schematic illustrating the coolant flow path of the cooling system of the present invention utilized to cool the engine illustrated in FIGS. 3 and 4.

Referring to FIGS. 3 and 5, the air intake system 81 preferably includes an air intake pipe 84 leading to the surge tank 82. The air intake pipe 84 has an end which is positioned within the cowling 26 of the motor 20 through which air is drawn from within the cowling 26. Air is drawn into the cowling 26 through an air vent (not shown) in the cowling 26. As will be appreciated by one skilled in the art, the air intake may be arranged so that air is drawn directly through the cowling 26 and into the pipe 84.

The air intake pipe 84 leads to the surge tank 82, the surge tank preferably extending along a side of the engine 22. A branch passage 86 extends from the surge tank 82 to an intake passage (not shown) leading through the cylinder block 52 to each cylinder 54.

As illustrated in FIG. 6, each fuel injector 74 is arranged to spray fuel into its respective cylinder 54. In this manner, a combined air and fuel charge is provided in each cylinder 54 for combustion.

Means are preferably provided for controlling the flow of the air through the intake pipe 84 to the surge tank 82. Preferably, this means comprises a throttle valve 88 positioned within the air intake pipe 84. The valve 88 preferably comprises a plate rotatably mounted within the air pipe 84, and controlled remotely by a throttle control (not shown).

Means are also provided for controlling the flow of air into each cylinder 54. Preferably, this means comprises one or more intake valves 90 positioned in the intake passage leading to each cylinder 54. Each valve 90 may be controlled with a camshaft 92, as known in the art.

Once the air and fuel charge is supplied to the cylinder 54, upward movement of the piston 58 compresses the charge.

This charge is ignited, such as with a spark plug (not shown), and the resulting combustion forces the piston 58 downwardly, effectuating a rotation of the crankshaft 42. The operation of the engine 22 in this manner is well known to those skilled in the art.

An exhaust passage 94 leads from each cylinder 54 for routing exhaust gases therefrom. Again, means are preferably provided for controlling the flow of exhaust through the passage 94. Preferably, this means comprises at least one exhaust valve 96. Each valve 96 is operated by a camshaft 98, as well known in the art. As the piston 58 moves upwardly in a cycle after combustion, the exhaust valve(s) 96 open, permitting the exhaust to flow from the cylinder 54.

Figure 4:
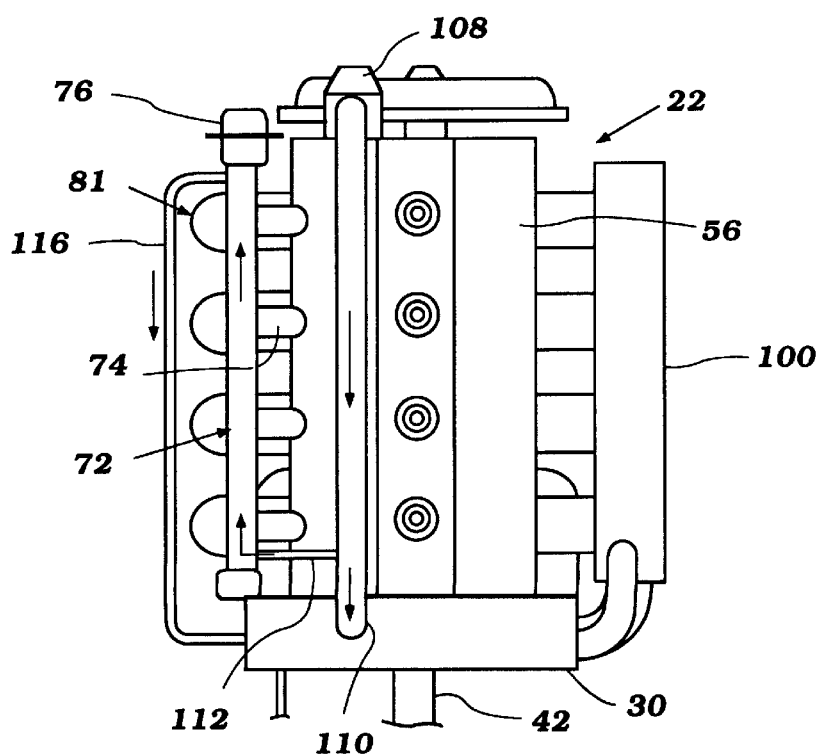
FIG. 4 is a front view of the engine illustrated in FIG. 3.

As illustrated in FIG. 4, the exhaust from each cylinder 54 is routed into an exhaust manifold 100 which extends along the side of the engine 22. The exhaust manifold 100 collects the exhaust gases from each cylinder 54 and routes them to an exhaust passage through the exhaust guide 30. The exhaust passing through the exhaust guide 30 is routed, such as by way of an exhaust pipe, to a discharge from the motor 20, as is well known in the art.

In accordance with the present invention, a cooling system is provided for cooling the engine 22 and at least a portion of the fuel supply. The cooling system includes a coolant supply, and a coolant delivery mechanism. Referring to FIG. 2, an inlet 102 leads through the casing defining the lower unit 28 of the motor 20, through which water from the body of water in which the motor 20 is being operated is drawn.

The coolant is drawn through the inlet 102 by a water pump 104. Preferably, the pump 104 is positioned in the lower unit 28 of the motor 20 and is driven by the drive shaft 44. Referring to FIG. 5, the pump 104 delivers coolant through a coolant path. The path includes a delivery pipe or passage 106 extending from the pump 104 upwardly through the lower unit 28 and exhaust guide 30 to a cooling jacket of the exhaust manifold 100.

The coolant passes through the exhaust manifold cooling jacket, and then into one or more passages or jackets 107 (see FIG. 7) within the cylinder block 52 and head 56 for cooling the main body of the engine 22. These passages may comprise individual cooling passages and/or cooling jackets surrounding the cylinders 54, as well known in the art.

After passing through the cylinder block 52 and head 54, the coolant selectively passes through a thermostat 108 to a cooling water return passage or pipe 110 extending downwardly from the top to the bottom of the engine 22. This passage 110 leads to a passage through the exhaust guide 30, and then on to a cooling water discharge from the motor 20.

Figure 7:
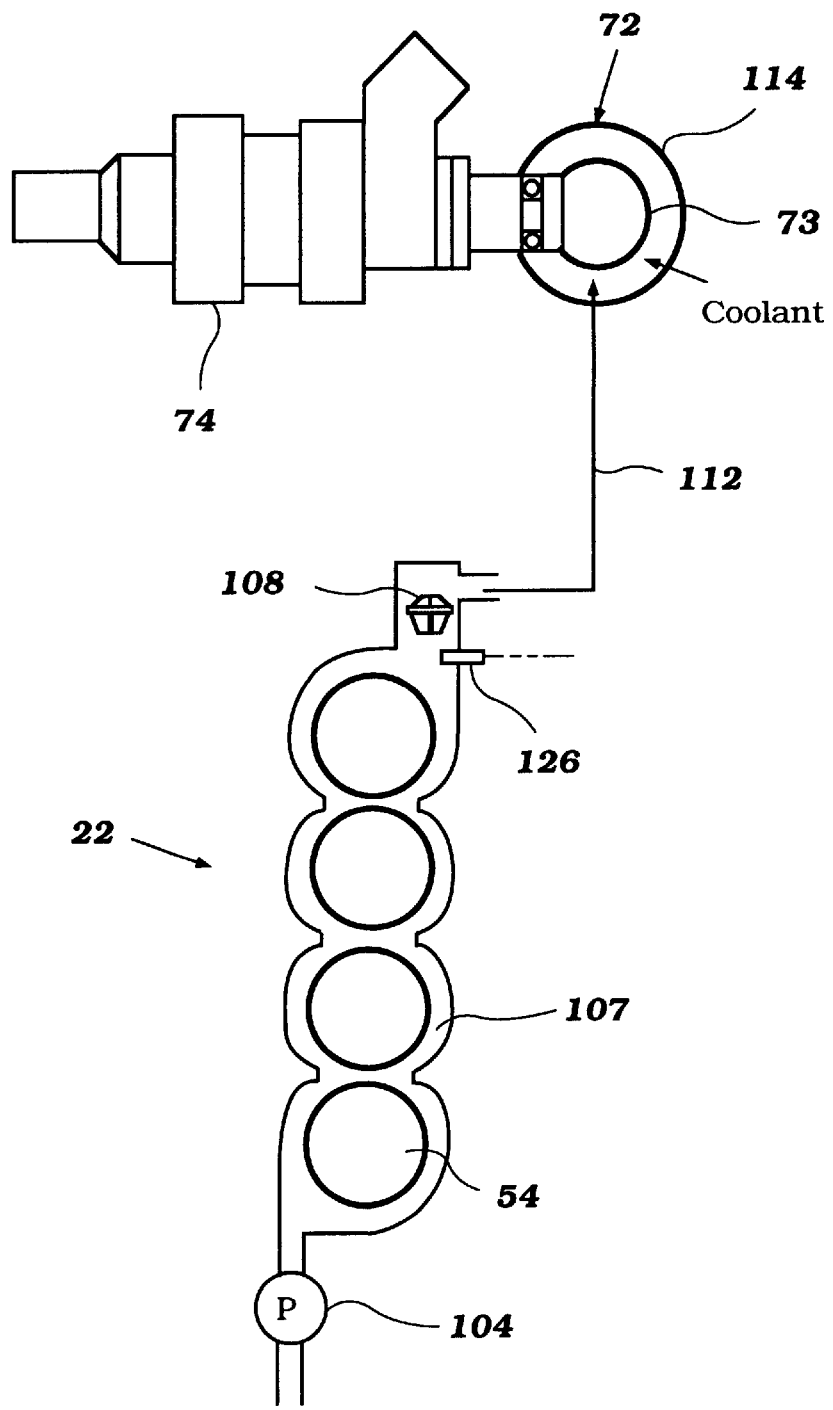
FIG. 7 illustrates in more detail the cooling system illustrated in FIG. 4.

A connecting pipe 112 extends from the cooling water pipe 110 generally horizontally across to a fuel rail cooling jacket 114. This connecting pipe 112 is preferably positioned near the bottom of the engine 22. The cooling jacket 114 for the fuel rail 72 is best illustrated in FIGS. 5 and 7. As illustrated therein, the jacket 114 comprises a tube surrounding the conduit 73 defining the fuel rail 72, and cooperating therewith to define a space through which the coolant may flow.

The coolant diverted through the connecting pipe 112 travels through the cooling jacket 114 towards the top of the engine 22, cooling the fuel within the rail before the fuel is delivered to the fuel injectors 72. Then, the coolant is routed through a return pipe 116 back to the bottom of the engine 22 to a passage through the exhaust guide 30, and thereafter to the coolant discharge.

Preferably, the engine 22 includes an electronic engine control unit (ECU) 118 for controlling various aspects of the engine 22. Various condition data is provided to the ECU 118 for this purpose. As illustrated in FIG. 6, an air pressure sensor 120 provides data regarding the pressure of the air supplied to the surge tank 82 of the engine 22. A throttle angle sensor 122 provides data to the ECU 118 regarding the throttle position. A crank angle sensor 124 provides data to the ECU 124 regarding the position of the crankshaft 42, and thus the pistons 58. Other sensors may also be provided, as known in the art. The data supplied by the sensors is used by the ECU 118 to control such engine operating functions as the timing of the fuel injection, the duration of the injection (affecting the air/fuel ratio), and the firing timing of spark plugs.

Also, a coolant temperature sensor 126 is provided. This sensor 126 is preferably mounted adjacent the thermostat 108, at that point where the coolant leaves the engine 22 through the coolant return passage 110. In the event the sensor 126 indicates that the coolant temperature is below a predetermined temperature and the engine 22 is cool, the ECU 118 instructs the thermostat 108 to close. This prevents coolant from flowing through the cooling system, allowing the engine 22 to warm up.

Once the temperature of the coolant is indicated by the sensor 126 to be above a predetermined temperature, the ECU 118 instructs the thermostat 108 to open, and coolant flows through the engine 22 and thereon to the coolant return passage 110. Some of this coolant is also diverted through the connecting pipe 112 to the coolant jacket 114 surrounding the fuel rail 72 for cooling the fuel passing therethrough.

In accordance with the present invention, the fuel supplied through the fuel rail is cooled. Since the fuel within the rail is cooled along the length of the rail, the density of the fuel supplied to each injector along the length of the rail is relatively uniform. In addition, when the fuel is cool, it is at a pressure which does not tend to open the pressure regulator 76 and cause a return of fuel to the vapor separator 66. Also, the fuel which is delivered through the injectors 74, while not necessarily at a high pressure (such as when the engine is operating at a low speed or low range) is dense. Thus, each combustion chamber is supplied with the same dense or rich mixture.

Because the fuel is cool, very little of the fuel vaporizes when the engine is operating at a low speed and is relatively cool. Instead, the majority of the fuel mixes with the air within the combustion chamber to form a relatively homogenous mixture of air and fuel which tends to burn evenly and promote stable combustion.

Of course, the foregoing description is that of preferred embodiments of the invention, and various changes and modifications may be made without departing from the spirit and scope of the invention, as defined by the appended claims.

What is claimed is:

1. An outboard motor comprised of a power head containing an internal combustion engine and a protective cowling enclosing said engine, a driveshaft housing and lower unit depending from said power head and containing a propulsion device driven by said engine, said engine having at least one combustion chamber, an intake system for supplying air to said combustion chamber, a fuel delivery system for supplying fuel to said combustion chamber, said fuel delivery system including a fuel supply mechanism for supplying fuel under pressure to a fuel injector through a fuel conduit, said fuel injector supplying fuel to said combustion chamber, and a cooling system for said engine, said cooling system including a cooling jacket for said engine and a cooling jacket for said fuel supply system, a coolant supply mechanism for drawing water from a body of water in which said outboard motor is operating and supplying water to said engine cooling jacket, a thermostat for sensing the temperature of water in said engine cooling jacket and returning water to the body of water when the temperature in said engine cooling jacket is above a predetermined value, and for supplying a portion of the returned water through said fuel supply system cooling jacket only when said water is above said predetermined temperature.

2. The outboard motor in accordance with claim 1, wherein said cooling system includes a pump in said driveshaft housing and lower unit driven by said engine for delivering the water to the cooling system.

3. The outboard motor in accordance with claim 1, wherein said fuel conduit cooling jacket comprises a cooling jacket surrounding a fuel rail that supplies fuel to the fuel injector.

4. The outboard motor in accordance with claim 3, wherein said fuel rail extends along said engine from a first end to a second end with fuel injectors spaced therealong.

5. The outboard motor in accordance with claim 4, wherein said fuel injectors are electronically operated.

6. The outboard motor in accordance with claim 5, wherein a fuel line extends from said injectors to a pressure regulator and a return line extends from said pressure regulator back to said fuel supply mechanism.

7. The outboard motor in accordance with claim 6, wherein said fuel supply mechanism comprises a pump delivering fuel from a vapor separator.

8. The outboard motor in accordance with claim 1, wherein said fuel conduit comprises a fuel rail in the form of a pipe having an outer wall and said fuel supply system cooling jacket comprises a conduit positioned around said pipe and cooperating therewith to define a space therebetween through which water flows.

9. The outboard motor in accordance with claim 1, wherein said fuel injector directs fuel into said combustion chamber along an intake passage leading to said combustion chamber.

* * * * *